Patented Oct. 4, 1932

1,880,978

UNITED STATES PATENT OFFICE

AUGUST J. PACINI, OF CHICAGO, ILLINOIS, ASSIGNOR TO SUN-A-SURED, INC., A CORPORATION OF DELAWARE

MEANS FOR SYNTHESIZING AND TRANSMUTING ANTIRICKETIC SUBSTANCES AND THE LIKE

No Drawing. Application filed February 17, 1928. Serial No. 255,193.

This invention relates to anti-ricketic products and the like, and with regard to certain more specific features, to a process for the simultaneous extraction and synthesis of vitamin D from yeasts, molds, fungi and the like.

Among the several objects of the invention may be noted the provision of means for extracting and simultaneously rendering anti-ricketic certain lipoids present in molds, yeasts and bacteria of diverse classes. Other objects will be in part obvious and in part pointed out hereinafter.

The invention accordingly comprises the elements and combinations of elements, steps and sequence of steps, features of synthesis and arrangements of parts which will be exemplified in the description hereinafter and the scope of the application of which will be indicated in the following claims.

I have found present in molds, yeasts and bacteria of diverse classes certain lipoids allied probably to ergosterol and in many instances identical thereto which, upon suitable extraction, can be rendered anti-ricketic by any of several methods. These methods include exposure to biologically effective ultraviolet rays, exposure to rays other than those which are biologically effective, exposure to infra-red radiation, or treating with enzymes or the like. These methods also include the above-named exposure methods made in the presence of suitable photo-catalysts such as bromine, chlorine, ozone, certain salts and the like.

As examples of the source of these activatable sterols can be mentioned, according to my findings, the following molds; certain of the mucor group, penicillium group, aspergillus group and some members of the thamnidium group; certain of the fungi belonging to the ascomycetes, the basidiomycetes and the like; and the principal yeasts of which baker's and brewer's yeast are but examples.

Dried growths of these organisms and the products of these organisms can be extracted with organic solvents, from which extract there is obtained a fatty material rich in activatable sterols. By the usual method of extraction, however, the resulting extract rich in activatable material is anti-ricketically inactive. Such extracts may be made anti-ricketic by any of the various processes above set out.

I have invented a method herein which effects not only a suitable extraction but which at the same time and at the same operation, confers anti-ricketic properties upon the material during that extraction; so that at the conclusion of a single simple operation there results a sterol extract endowed with rich anti-ricketic property and serviceable as a rich source of vitamin D.

The following comprises an example of my method, in which yeast (preferably compressed baker's yeast) is used for purposes of describing the process which applies equally well to the other classes of products above mentioned. Ten grams of compressed yeast is crumbled and dried at 105° C. for a sufficient time to expel an excess of its moisture. It is not essential that the yeast or similar preparation be "bone-dry". Usually, sufficient drying is reached at the end of thirty to forty minutes, but this time may be varied to suit the particular case, as governed by the original moisture content. The partially dried and crumbled yeast or preparation is placed in a suitable flask, such as an Erlenmeyer flask, or in a form of Soxhlet extraction apparatus, and is overlaid with an organic extractant such as carbon tetrachloride or chloroform, and then admixed with suitable amount of photo-catalyst of the nature of those above described or, as for example pyrolusite, uranium salts, acetic acid and the many and various other photo-catalysts which I have discovered competent to effect transmutation to vitamin D. It is to be understood that the organic extractant may be other than carbon tetrachloride, such as for example alcohol, ether, petroleum ether and other solvents of this class.

The entire mass, yeast, solvent and photo-catalyst, are refluxed at the boiling temperature of the solvent for from 1 to 3 hours. The time will vary according to the original material used. In the case of yeasts, this amounts generally to 2 hours. In the case of aspergillus extracts, the time may be shortened.

Under the reflux treatment, the solvent extracts the fatty substances, including the lipoids which are subject to activation; and the photo-catalyst at the same time effects a gradual transmutation to the anti-ricketic state. At the conclusion of the above treatment, the following tests are satisfied, indicating that a vitamin has been formed:

1. A quantitative lowering of the melting point, attributable only to the formation of a new substance.
2. Typical spectrographic absorption changes, such as a change in band formations and polariscopic rotation.
3. Development of the anilin color reaction.
4. Animal responses.

It appears that certain substances such as those above mentioned, elaborate growth-producing substances, such as the so-called vitamin A. I have found that the growth-producing substance, vitamin A, is composed of several individual growth-producing components or substances, one of which components produces an anti-xerophthalmic effect which may be transmuted to a growth-producing and anti-ricketic effect associated with vitamin D.

Thus, at the conclusion of the above extracting and catalytic treatment, there results a carbon tetrachloride, or other organic solvent solution of activated lipoidal material. This material may be separated from the solvent by simple evaporation, as the result of which there remains an activated sterol concentrate. If it is desired, the material thus obtained may be refined further by saponification, the unsaponifiable portion being retained for further use as the highly concentrated, vitmain D containing material.

It is understood that my selection of photo-catalysts is not limited to the few mentioned, but applies to the entire group of photo-catalysts, which are likewise capable of effecting the necessary formation. By photo-catalysts herein, I mean to include such substances which are adapted to speed or enhance the speed of a photochemical reaction, involving visible or invisible light, including the infra-red rays, and which as a class are characterized by their being electronically unsaturated; that is, they possess one or more free valence electrons. It is my discovery that such photo-catalysts, probably on account of their free valence electrons, effect the desired conversion to vitamin D when utilized in the above-described manner. Such photo-catalysts function in a true catalytic manner, so that substantially complete, quantitative recovery of the unchanged catalysts may be achieved after a reaction has been carried to completion. It is understood moreover that yeast is but an example of one member of many classes and groups of organisms and materials subject to the activation and/or extraction. It is to be understood herein that by the term "substrate" is meant all substances of the class described, including, for example, lipoids, which are capable of being activated with vitamins as set out hereinbefore.

The material obtained in the manner above described may be used as a concentrated form of vitamin D without further change. Or it may be added to foods of any variety to supply the usual deficiency of vitamin D. As an example of the use of the vitamin so created, may be mentioned the addition of the concentrate to oleomargarine, to cereals, to corn oil to chocolate and a great variety of other uses.

One of the advantages of this invention is the facility and ease with which a highly concentrated vitamin D preparation may be made. Only a single step is required. Only the most inexpensive original materials are used. Great economy is effected in the preparation because of the inexpensive method involved. Also, there is no danger associated with the operations.

In view of the foregoing, it will be seen that the several objects of the invention are achieved and other advantageous results attained.

As many changes could be made in carrying out the above objects without departing from the scope of the invention, it is intended that all matter contained in the above description shall be interpreted as illustrative and not in a limiting sense.

I claim:

1. The method of producing anti-ricketic products comprising refluxing lipoidal material with an extractant in the presence of a photo-catalyst adapted to effect a conversion to vitamin D, at substantially the boiling temperature of the extractant and for a period of the order of one to three hours.

2. The method of producing anti-ricketic products, comprising refluxing a substance containing lipoids in the presence of a solvent and a photo-catalyst adapted to effect conversion to vitamin D, at a sufficiently high temperature and for a sufficient period of time to effect conversion of at least part of the lipoidal material to anti-ricketic products.

In testimony whereof, I have signed my name to this specification this 14th day of February, 1928.

AUGUST J. PACINI.